INVENTORS
Vlastimil Koukal, Otokar Krákora

United States Patent Office 3,474,197
Patented Oct. 21, 1969

3,474,197
ELECTRET MICROPHONE
Vlastimil Koukal and Otokar Krákora, Hradec Kralove, Czechoslovakia, assignors to Tesla, narodni podnik, Prague, Czechoslovakia
Filed Oct. 13, 1965, Ser. No. 495,452
Claims priority, application Czechoslovakia, Oct. 24, 1964, 5,921/64; Oct. 26, 1964, 5,951/64
Int. Cl. H04r 19/04
U.S. Cl. 179—111                                5 Claims

ABSTRACT OF THE DISCLOSURE

The electret member of an electret microphone is a substantially cylindrical body of barium titanate composition having a first flat end face opposite the microphone diaphragm and a second end face covered with a fixedly attached electrode which extends into a blind axial bore centered in the second end face. The electret is attached to a supporting plate by a bolt soldered to the electrode in the bore and fastened to the support plate by a nut. The bolt provides the conductive lead for the electret.

---

This invention relates to an electret microphone. The electret member of a microphone is usually a circular or elliptical disk which may be provided with holes for modifying the electroacoustic qualities of the microphone. All parts of the known microphone are fixed in a housing by means of circular rings. The electret member must be insulated very carefully from the other parts of the microphone because it is a source of a very high output impedance whose real component may be up to $10^7 \Omega$. Even the smallest traces of impurity or moisture, or a leak of the insulating rings impair the operation of the microphone. The setting of the air gap between the diaphragm and the electret member is also of great importance for good operation of the microphone.

The known electret microphones do not meet all requirements. The supporting members for the electret must be made of ceramics which must be fired and shrink during the firing so that they must be laboriously finished by grinding. Between the electret member and the electrode there are microscopic pores which interfere with the electric as well as the mechanical contact of the electrode with the electret member. The known arrangements are not of sufficient mechanical stability and the setting of the optimal air gap between the membrane and the electret member is therefore very difficult. For the above-mentioned reasons, microphones equipped with an inorganic electret member heretofore have not been produced on a large scale, although they have several very good qualities and have been well-known for many years.

The present invention provides an electret microphone with a cylindrical electret member having an electrode fixedly attached to the base of the electret member and conductively connected with a fastening bolt which attaches the electret member to a supporting plate. A blind bore whose walls are covered with electrode metal and into which the fixing bolt is soldered, is centered in the longitudinal axis of the base face of the electret member. Elongated grooves are provided in the top face of the electret member.

The inorganic electret member may be produced from any suitable material. It may contain, for example, from 70 to 98 mol percent $BaTiO_3$ and further the following components: 0 to 6 mol percent $PbTiO_3$, 0 to 15 mol percent $CaTiO_3$, 0 to 2 mol percent $MgO$, 0 to 8 mol percent $PbSnO_3$, 0 to 10 mol percent of $CaSnO_3$ and 0 to 5 mol percent $Bi_2(SnO_3)_3$.

Within the limits given above any electret composition may be used. An electret composition according to any of the following examples will be especially advantageous. These examples of course do not exhaust or limit the range of the invention.

TABLE

| Example | Mol Percent | | | |
|---|---|---|---|---|
| | 1 | 2 | 3 | 4 |
| $BaTiO_3$ | 77–90 | 94.0 | 95.0 | 92.0 |
| $PbTiO_3$ | 3–6 | | | |
| $CaTiO_3$ | 6–15 | | | |
| $PbSnO_3$ | | 2.5 | | 0.5 |
| $CaSnO_3$ | | 2.5 | 3.5 | 7 |
| $Bi_2(SnO_3)_3$ | | 1.0 | 1.5 | 0.5 |
| $MgO$ | 0.5–2 | | | |

When mounting the electret microphone according to the invention, it is of advantage to place the unpolarized electret member in the microphone housing so as to set the optimal air gap between the diaphragm and the electret member, whereupon the electret member is polarized in the usual manner and the microphone housing is closed.

If the electret member were polarized before being put into the housing of the microphone, it would be contaminated and short-circuited during mounting and especially during the setting of the optimal air gap between the diaphragm and the electret member. The sensitivity of the microphone would be reduced significantly.

The drawing illustrates a preferred embodiment of the invention.

Figure 1:
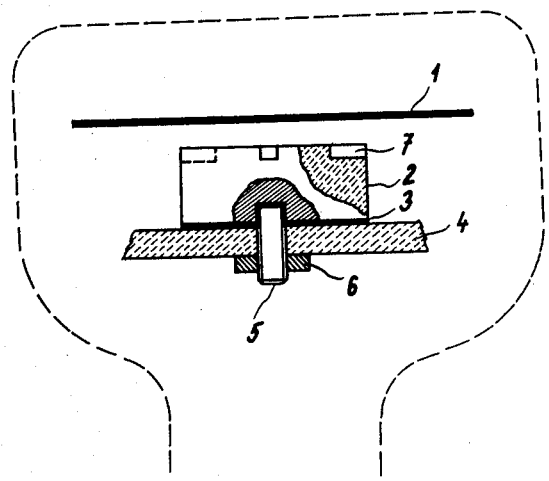
FIG. 1 shows an electret microphone of the invention in fragmentary elevation and partly in section on the axis of the electret member.
Figure 2:
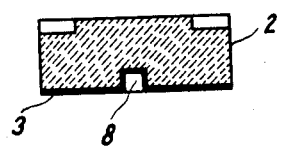
FIG. 2 shows the electret member of the microphone of FIG. 1 in elevational section on the axis thereof.
Figure 3:
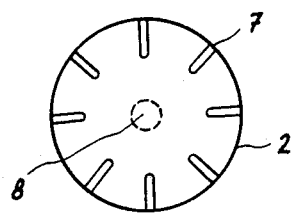
FIG. 3 is a plan top view of the electret member.

Only as much of an otherwise conventional electret microphone is shown in the drawing as is needed for an understanding of the invention. The microphone has a diaphragm 1 as is conventional. An electret member 2, which is a generally cylindrical member of ceramic barium titanate composition, is mounted in the microphone housing, shown in phantom view, in such a manner that the axially terminal top face of the electret member is spacedly opposite the membrane 1. The bottom face of the electret member 2 is covered by a fixedly attached metal electrode 3 held in abutting engagement with a supporting plate 4 by a bolt 5 and a nut 6 threadedly mounted on the bolt.

The top face of the electret member 2 is formed with eight elongated grooves 7 which extend radially inward from the periphery of the top face and are equiangularly distributed about the circumference of the electret member. A blind axial bore 8 is centered in the bottom face of the electret member 2. Its walls are covered by the metal of the electrode 3, and the bolt 5 is received in the bore 8 and soldered to the electrode metal in electrically conductive engagement.

The grooves 7 modify the electroacoustical properties of the microphone. Conductors, not shown, connect the diaphragm 1 and the bolt 5 to an amplifier circuit external to the microphone proper, and the bolt 5 thus constitutes an element of the conductive lead arrangement of the microphone.

The electret microphone according to the invention avoids the inadequacies of the known devices; its construction and production are simple; it is not necessary to make holes in the electret member; the lower electrode firmly adheres to the electret member and the connection between the electret member and the electrode cannot be damaged. The microphone according to the invention is more resistant to atmospheric and mechanical influences.

What we claim is:

1. In a microphone having a diaphragm, an electret member spacedly opposite said diaphragm, a housing enclosing said diaphragm and said electret member, and conductive means for connecting said diaphragm and said electret member to an electric circuit, the improvement which comprises:
   (a) said electret member being a substantially cylindrical body of ceramic material and having a first axially terminal face spacedly opposite said diaphragm, and a second axially terminal face directed away from said diaphragm,
   (b) said electret member being formed with a plurality of elongated grooves in said first face,
   (c) a supporting member in said housing,
   (d) an electrode substantially covering said second face and fixedly fastened to said second face, and
   (e) fastening means fastening said electret member to said supporting member in abutting engagement of said electrode with said supporting member.

2. In a microphone as set forth in claim 1, said electret member being formed with an axial blind bore extending inward from said second face, said electrode being received in said bore, and said fastening means including a fastening member secured to said electrode in said bore and to said supporting member.

3. In a microphone as set forth in claim 2, said fastening member being electrically conductive and soldered to said electrode in said bore to constitute a portion of said conductive means.

4. In a microphone as set forth in claim 1, said electret member essentially consisting of 77 to 90 mol. percent $BaTiO_3$, 3 to 6 mol. percent $PbTiO_3$, 6 to 15 mol. percent $CaTiO_3$, and 0.5 to 2 mol percent MgO.

5. In a microphone as set forth in claim 1, said grooves being elongated radially inward from the periphery of said first face and being equiangularly spaced about the axis of said electret member.

References Cited

UNITED STATES PATENTS 3,301,786  1/1967  Klaps _____ 252—63.2
3,118,022  1/1964  Sessler et al.

KATHLEEN H. CLAFFY, Primary Examiner

ARTHUR A. McGILL, Assistant Examiner